United States Patent
Alexander et al.

(10) Patent No.: US 7,032,097 B2
(45) Date of Patent: Apr. 18, 2006

(54) ZERO CYCLE PENALTY IN SELECTING INSTRUCTIONS IN PREFETCH BUFFER IN THE EVENT OF A MISS IN THE INSTRUCTION CACHE

(75) Inventors: Gregory W. Alexander, Austin, TX (US); David S. Levitan, Austin, TX (US); Balaram Sinharoy, Poughkeepsie, NY (US); William J. Starke, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 387 days.

(21) Appl. No.: 10/422,808

(22) Filed: Apr. 24, 2003

(65) Prior Publication Data

US 2004/0215921 A1   Oct. 28, 2004

(51) Int. Cl.
   *G06F 12/00*   (2006.01)
(52) U.S. Cl. .................. 711/216; 711/125; 711/137; 711/220; 712/205; 712/207; 712/237
(58) Field of Classification Search ............... 711/125, 711/137, 216, 220; 712/205, 207, 237
See application file for complete search history.

(56) References Cited

U.S. PATENT DOCUMENTS

| | | | |
|---|---|---|---|
| 5,113,515 A | 5/1992 | Fite et al. .................. 395/425 |
| 5,630,157 A | 5/1997 | Dwyer, III ................. 395/800 |
| 5,790,823 A | 8/1998 | Puzak et al. ................ 395/383 |
| 5,845,101 A * | 12/1998 | Johnson et al. ............. 712/207 |
| 5,860,096 A * | 1/1999 | Undy et al. ................. 711/122 |
| 6,012,134 A * | 1/2000 | McInerney et al. ......... 711/207 |

OTHER PUBLICATIONS

Hennessy and Patterson, Computer Organization and Design, 1998, Morgan Kaufmann Publishers, 2nd Ed, PP 568-575.*
Jouppi, Improving Direct-Mapped Cache Performance by the Addition of a Small Fully-Associative Cache and Prefetch Buffers, 1990, IEEE, pp 364-373.*

* cited by examiner

*Primary Examiner*—Donald Sparks
*Assistant Examiner*—Bao Q. Truong
(74) *Attorney, Agent, or Firm*—Robert A. Voigt, Jr.; Winstead Sechrest & Minick P.C.; Casimer K. Salys (57) ABSTRACT

A method and processor for selecting instructions in a prefetch buffer in the event of a miss in an instruction cache with a zero cycle penalty. A first, second and third hash may be performed on an address retrieved from a program counter. The first hashed address may be used to index into the instruction cache. The second hashed address may be used to index into the prefetch buffer. If the value stored in the indexed entry in an effective address array of the instruction cache does not equal the value of the third hash of the address (an instruction cache miss), then the instructions in the indexed entry in the prefetch buffer are selected. In this manner, instructions may be selected in the prefetch buffer in the event of a miss in the instruction cache with a zero cycle penalty.

24 Claims, 9 Drawing Sheets

ZERO CYCLE PENALTY IN SELECTING INSTRUCTIONS IN PREFETCH BUFFER IN THE EVENT OF A MISS IN THE INSTRUCTION CACHE

TECHNICAL FIELD

The present invention relates to the field of cache design, and more particularly to a mechanism for selecting instructions in a prefetch buffer in the event of a miss in an instruction cache with a zero cycle penalty.

BACKGROUND INFORMATION

Modern processors, such as a simultaneous multithreading (SMT) processor, may include an instruction cache and a prefetch buffer. The instruction cache may include an array of real addresses and an array of associated instructions. The prefetch buffer may be similarly configured though the arrays are typically on a much smaller scale. The prefetch buffer may be configured to store real addresses and the associated instructions for prefetched instructions. Prefetched instructions may refer to instructions fetched from memory, e.g., main memory, prior to the time the instructions are requested by the processor. The instructions fetched from memory, e.g., main memory, to be stored in the prefetch buffer may be speculatively prefetched based on the principle that if a memory location is addressed by the processor, the next sequential address will likely be requested by the processor in the near future. The prefetched instructions in the prefetch buffer may be speculatively prefetched in response to a speculative request as discussed below.

Speculatively fetching instructions may occur when a processor speculates as to whether a received branch instruction will be taken or not taken based on some prior history. If a branch instruction is predicted to be taken, then the flow of the program is altered, i.e., the sequence of instruction execution is altered. If the branch instruction is predicted to not be taken, then the following sequential instructions are executed. In either case, the stream of instructions executed are said to be "speculatively" executed. If the branch is predicted incorrectly, i.e., the processor predicted incorrectly as to whether a branch instruction will be taken or not, the speculatively executed instructions are flushed.

Upon speculating as to whether a received branch instruction will be taken or not taken, or upon flushing a sequence of speculatively fetched instructions that were predicted incorrectly, an SMT processor may fetch a sequence of speculative or non-speculative addresses from the program counters which may be used to index into the instruction cache. Typically, a hash of this address (referring to either using the value stored in particular bits of the address from the program counter or using an algorithm that may generate a different value and number of bits from the address fetched from the program counter) is performed and the hash is used to index into the instruction cache. Further, a hash (may be a different hash than the hash used to index into the instruction cache) of the address from the program counter may be used to index into the prefetch buffer. In order to determine whether the instructions stored in the instruction cache or in the prefetch buffer should be selected, an address translation of the address from the program counter may be performed to translate the address into the corresponding real address. The real address may refer to the address in physical memory. The translated real address may be compared with the real address in the indexed entry in the instruction cache to determine whether the instructions in the instruction cache should be selected. If the translated real address is equal to the indexed real address in the instruction cache (referred to as a cache hit), then the instructions in the instruction cache are selected. If the translated real address is not equal to the indexed real address in the instruction cache (referred to as a cache miss), then the instructions in the prefetch buffer are selected. However, the determination as to whether there is a cache hit or miss takes longer than a clock cycle. Hence, in the case of a cache miss, the selection of the instructions in the prefetch buffer takes longer than a clock cycle. It is noted that the selection of the instructions in the instruction cache or in the prefetch buffer may be in error. Hence, a determination may later be made as to whether the instructions selected in either the instruction cache or the prefetch buffer were the appropriate instructions to be selected. If there was an error in the selection of the instructions in either the instruction or the prefetch buffer, the appropriate instructions may be fetched from main memory.

It takes longer than a clock cycle to determine if there is a cache hit or miss since the steps of translating the address from the program counter into its corresponding real address and then comparing the translated real address with the indexed real address in the instruction cache to determine if there is a cache hit or miss takes longer than a clock cycle. Hence, there is a one cycle lag in selecting the instructions from the prefetch buffer if there is a miss in the instruction cache. By taking an extra cycle to select the instructions from the prefetch buffer in the case of a miss in the instruction cache, processor performance is hindered.

Therefore, there is a need in the art to select the instructions in a prefetch buffer in the event of a miss in the instruction cache with a zero cycle penalty, i.e., within a single clock cycle.

SUMMARY

The problems outlined above may at least in part be solved in some embodiments by having the instruction cache comprise an array of hashed effective addresses. A first hash of the address retrieved from the program counter may be performed where the first hashed address may be used to index into the instruction cache. A second hash of the address retrieved from the program counter may be performed where the second hashed address may be used to index into the prefetch buffer. A comparison may be made between the value stored in the indexed entry in the effective address array of the instruction cache and the value of a third hash of the address retrieved from the program counter. If the value stored in the indexed entry in the effective address array of the instruction cache equals the value of the third hash of the address retrieved from the program counter (a cache hit), then the instructions in the indexed entry are selected. However, if the value stored in the indexed entry in the effective address array of the instruction cache does not equal the value of the third hash of the address retrieved from the program counter (a cache miss), then the instructions in the indexed entry in the prefetch buffer are selected. In this manner, instructions may be selected in the prefetch buffer in the event of a miss in the instruction cache within a single clock cycle, i.e., with a zero cycle penalty. That is, instructions may be selected in the prefetch buffer in the event of a miss in the instruction cache without an extra cycle lag.

In one embodiment of the present invention, a method for selecting instructions in a prefetch buffer in the event of a miss in an instruction cache with a zero cycle penalty may comprise the step of retrieving an address from a program counter. A first hash on the address may be performed. The instruction cache may be indexed using the first hashed address. Further, a second hash on the address retrieved from the program counter may be performed. The prefetch buffer may be indexed using the second hashed address. Further, a third hash on the address retrieved from the program counter may be performed. The value of the third hash on the address may be compared with the value stored in an indexed entry in an effective address array of the instruction cache. The instructions in the indexed entry in the prefetch buffer may be selected if the value stored in the indexed entry in the effective address array of the instruction cache does not match the value of the third hash on the address retrieved from the program counter.

The foregoing has outlined rather broadly the features and technical advantages of one or more embodiments of the present invention in order that the detailed description of the invention that follows may be better understood. Additional features and advantages of the invention will be described hereinafter which form the subject of the claims of the invention.

BRIEF DESCRIPTION OF THE DRAWINGS

A better understanding of the present invention can be obtained when the following detailed description is considered in conjunction with the following drawings, in which.

DETAILED DESCRIPTION

The present invention comprises a method and processor for selecting instructions in a prefetch buffer in the event of a miss in an instruction cache with a zero cycle penalty. In one embodiment of the present invention, an address may be retrieved from a program counter. A first hash of the address retrieved from the program counter may be performed where the first hashed address may be used to index into the instruction cache. A second hash of the address retrieved from the program counter may be performed where the second hashed address may be used to index into the prefetch buffer. A third hash of the address retrieved from the program counter may be performed. A comparison may be made between the value stored in the indexed entry in the effective address array of the instruction cache and the value of the third hash of the address. If the value stored in the indexed entry in the effective address array of the instruction cache equals the value of the third hash of the address retrieved from the program counter (a cache hit), then the instructions in the indexed entry are selected. However, if the value stored in the indexed entry in the effective address array of the instruction cache does not equal the value of the third hash of the address retrieved from the program counter (a cache miss), then the instructions in the indexed entry in the prefetch buffer are selected. In this manner, instructions may be selected in the prefetch buffer in the event of a miss in the instruction cache with a zero cycle penalty.

Although the present invention is described with reference to a simultaneous multithreading processor, it is noted that the principles of the present invention may be applied to any type of processor including single thread and other types of multithreading, e.g., course grained, fine-grained multi-threading. It is further noted that a person of ordinary skill in the art would be capable of applying the principles of the present invention as discussed herein to any type of processor. It is further noted that embodiments applying the principles of the present invention to any type of processor would fall within the scope of the present invention.

In the following description, numerous specific details are set forth to provide a thorough understanding of the present invention. However, it will be apparent to those skilled in the art that the present invention may be practiced without such specific details. In other instances, well-known circuits may be shown in block diagram form in order not to obscure the present invention in unnecessary detail. For the most part, details considering timing, data formats within communication protocols, and the like have been admitted in as much as such details are not necessary to obtain a complete understanding of the present invention and are within the skills of persons of ordinary skill in the relevant art.

Figure 1:
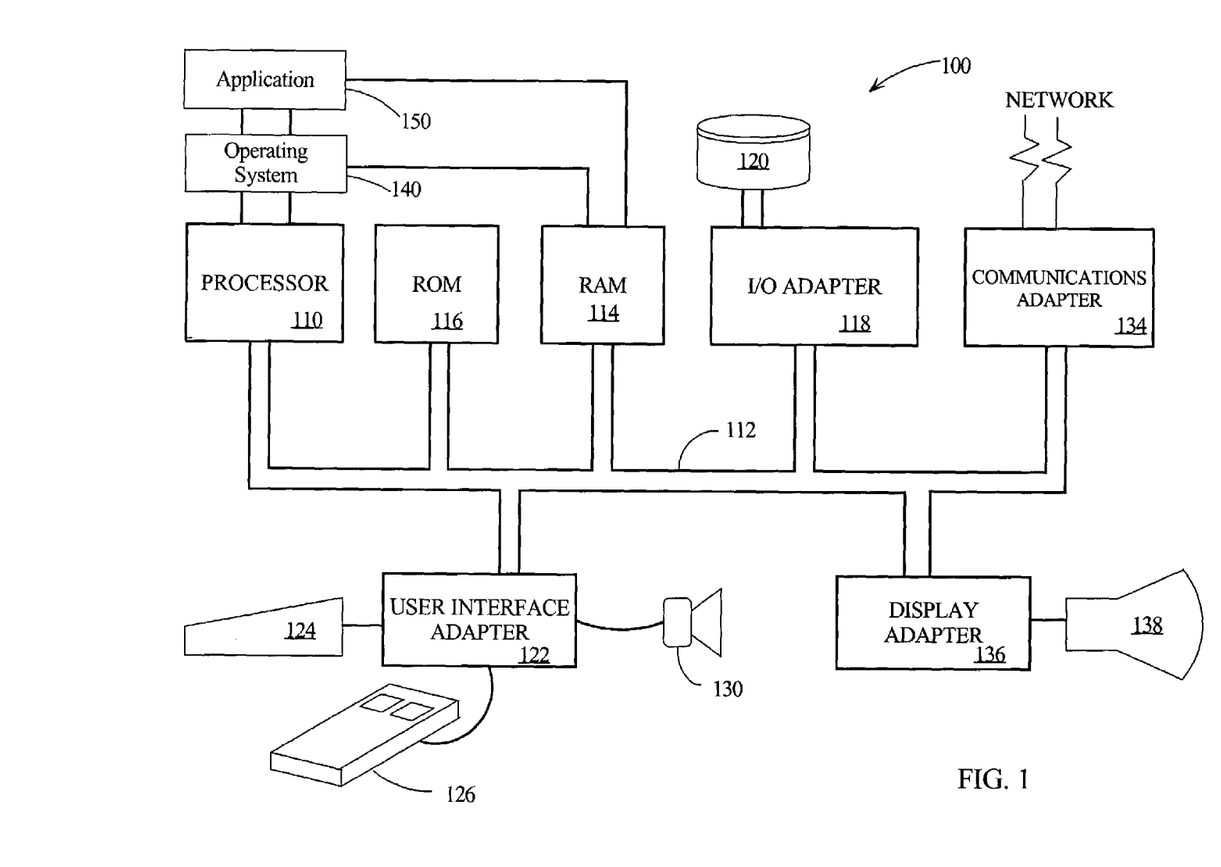
FIG. 1 illustrates an embodiment of the present invention of a computer system.

FIG. 1—Computer System

FIG. 1 illustrates a typical hardware configuration of computer system 100 which is representative of a hardware environment for practicing the present invention. Computer system 100 may have a processing unit 110 coupled to various other components by system bus 112. Processing unit 110 may be a simultaneous multithreading processor as described in detail below in conjunction with FIG. 2. An operating system 140 may run on processor 110 and provide control and coordinate the functions of the various components of FIG. 1. An application 150 in accordance with the principles of the present invention may run in conjunction with operating system 140 and provide calls to operating system 140 where the calls implement the various functions or services to be performed by application 150. Read-Only Memory (ROM) 116 may be coupled to system bus 112 and include a basic input/output system ("BIOS") that controls certain basic functions of computer system 100. Random access memory (RAM) 114 and disk adapter 118 may also be coupled to system bus 112. It should be noted that software components including operating system 140 and application 150 may be loaded into RAM 114 which may be computer system's 100 main memory for execution. Disk adapter 118 may be an integrated drive electronics ("IDE") adapter that communicates with a disk unit 120, e.g., disk drive.

Referring to FIG. 1, computer system 100 may further comprise a communications adapter 134 coupled to bus 112. Communications adapter 134 may interconnect bus 112 with an outside network enabling computer system 100 to communicate with other such systems. I/O devices may also be connected to system bus 112 via a user interface adapter 122 and a display adapter 136. Keyboard 124, mouse 126 and speaker 130 may all be interconnected to bus 112 through user interface adapter 122. Event data may be inputted to computer system 100 through any of these devices. A display monitor 138 may be connected to system bus 112 by display adapter 136. In this manner, a user is capable of inputting to computer system 100 through keyboard 124 or mouse 126 and receiving output from computer system 100 via display 138.

Figure 2:
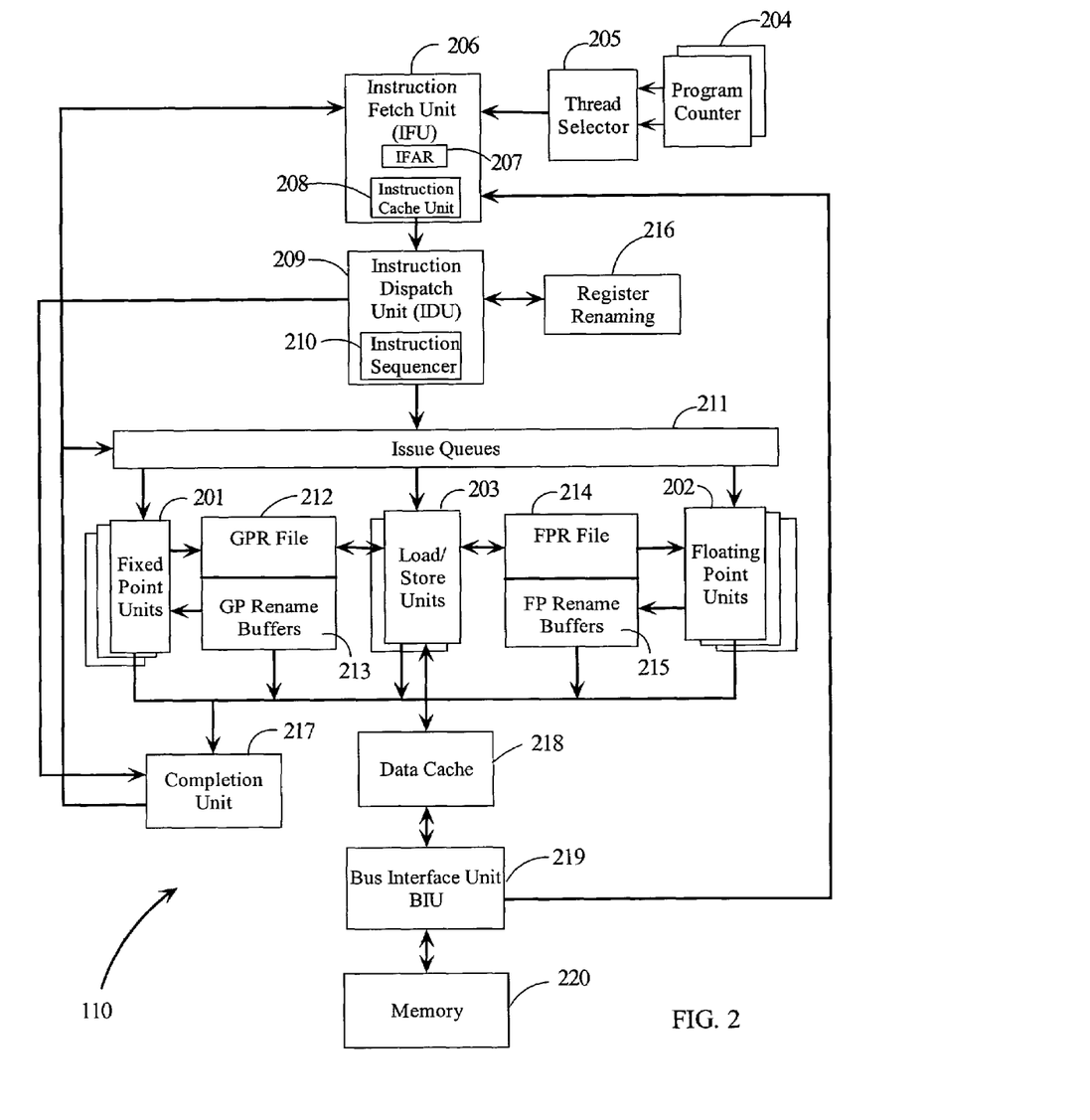
FIG. 2 illustrates an embodiment of the present invention of a simultaneous multithreading processor.

FIG. 2—Simultaneous Multithreading Processor

FIG. 2 illustrates an embodiment of a simultaneous multithreading processor 110. Multithreading processor 110 may be configured to execute multiple instructions per clock cycle. Further, processor 110 may be configured to simultaneous execute instructions from multiple threads as discussed further below. These instructions may be executed in any of the execution units of processor 110 including Fixed Point Units (FXU's) 201, Floating Point Units (FPU's) 202 and Load/Store Units (LSU's) 203 during any one clock cycle. It is noted that processor 110 may comprise other execution units, such as branch execution units, and that processor 110 is not limited in scope to any one particular embodiment. It is further noted that processor 110 may include additional units, registers, buffers, memories, and other sections than illustrated in FIG. 2. It is further noted that some of the elements described below such as issue queues 211, FXU's 201, FPU's 202, LSU's 203, may be referred to either collectively or individually, e.g., FXU's 201, FXU 201. It is further noted that although processor 110 is described below as executing instructions from two threads that processor 110 may be configured to execute instructions from any number of threads.

Referring to FIG. 2, processor 110 may comprise Program Counters (PC's) 204 that correspond to multiple threads, e.g., thread one, thread two, that have instructions for execution. A thread selector 205 may toggle on each clock cycle to select which thread to be executed. Upon selection of a particular thread, an Instruction Fetch Unit (IFU) 206 may be configured to load the address of an instruction from PC's 204 into Instruction Fetch Address Register 207. The address retrieved from PC's 204 may be an effective address representing an address from the program or compiler. The instruction corresponding to the received effective address may be accessed from Instruction Cache (I-Cache) unit 208 comprising an instruction cache (not shown) and a prefetch buffer (not shown). The instruction cache and prefetch buffer may both be configured to store instructions. Instructions may be inputted to instruction cache and prefetch buffer from a system memory 220 through a Bus Interface Unit (BIU) 219. A more detail description of instruction cache unit 208 including the instruction cache and prefetch buffer is provided further below in conjunction with FIGS. 3 and 8.

Instructions from I-Cache unit 208 may be outputted to Instruction Dispatch Unit (IDU) 209. IDU 209 may be configured to decode these received instructions. At this stage, the received instructions are primarily alternating from one thread to another. IDU 209 may further comprise an instruction sequencer 210 configured to forward the decoded instructions in an order determined by various algorithms. The out-of-order instructions may be forwarded to one of a plurality of issue queues 211 where a particular issue 211 may be coupled to one or more particular execution units, fixed point units 201, load/store units 203 and floating point units 202. Each execution unit may execute one or more instructions of a particular class of instructions. For example, FXU's 201 may execute fixed point mathematical and logic operations on source operands, such as adding, subtracting, ANDing, ORing and XORing. FPU's 202 may execute floating point operations on source operands, such as floating point multiplication and division. FXU's 201 may input their source and operand information from General Purpose Register (GPR) file 212 and output their results (destination operand information) of their operations for storage at selected entries in General Purpose rename buffers 213. Similarly, FPU's 202 may input their source and operand information from Floating Point Register (FPR) file 214 and output their results (destination operand information) of their operations for storage at selected entries in Floating Point (FP) rename buffers 215.

Processor 110 may dynamically share processor resources, such as execution units, among multiple threads by renaming and mapping unused registers to be available for executing an instruction. This may be accomplished by register renaming unit 216 coupled to IDU 209. Register renaming unit 216 may be configured to determine the registers from the register file, e.g., GPR file 212, FPR file 214, that will be used for temporarily storing values indicated in the instructions decoded by IDU 209.

As stated above, instructions may be queued in one of a plurality of issue queues 211. If an instruction contains a fixed point operation, then that instruction may be issued by an issue queue 211 to any of the multiple FXU's 201 to execute that instruction. Further, if an instruction contains a floating point operation, then that instruction may be issued by an issue queue 211 to any of the multiple FPU's 202 to execute that instruction.

All of the execution units, FXU's 201, FPU's 202, LSU's 203, may be coupled to completion unit 217. Upon executing the received instruction, the execution units, FXU's 201, FPU's 202, LSU's 203, may transmit an indication to completion unit 217 indicating the execution of the received instruction. This information may be stored in a table (not shown) which may then be forwarded to IFU 206. Completion unit 217 may further be coupled to IDU 209. IDU 209 may be configured to transmit to completion unit 217 the status information, e.g., type of instruction, associated thread, of the instructions being dispatched to issue queues 211. Completion unit 217 may further be configured to track the status of these instructions. For example, completion unit 217 may keep track of when these instructions have been "completed." An instruction may be said to be "completed" when it has executed and is at a stage where any exception will not cause the re-issuance of this instruction. Completion unit 217 may further be coupled to issue queues 211 and further configured to transmit an indication of an instruction being completed to the appropriate issue queue 211 that issued the instruction that was completed.

LSU's 203 may be coupled to a data cache 218. In response to a load instruction, LSU 203 inputs information from data cache 218 and copies such information to selected ones of rename buffers 213, 215. If such information is not stored in data cache 218, then data cache 218 inputs through Bus Interface Unit (BIU) 219 such information from a system memory 220 connected to system bus 112 (FIG. 1). Moreover, data cache 218 may be able to output through BIU 219 and system bus 112 information from data cache 218 to system memory 220 connected to system bus 112. In response to a store instruction, LSU 203 may input information from a selected one of GPR 212 and FPR 214 and copies such information to data cache 218.

It is noted that processor 110 may comprise any number of execution units, e.g., FXU 201, FPU's 202, LSU's 203, any number of issue queues 211, program counters 201 representing threads, GPR's 212 and FPR's 214, and that processor 110 is not to be confined in scope to any one particular embodiment.

Figure 3:
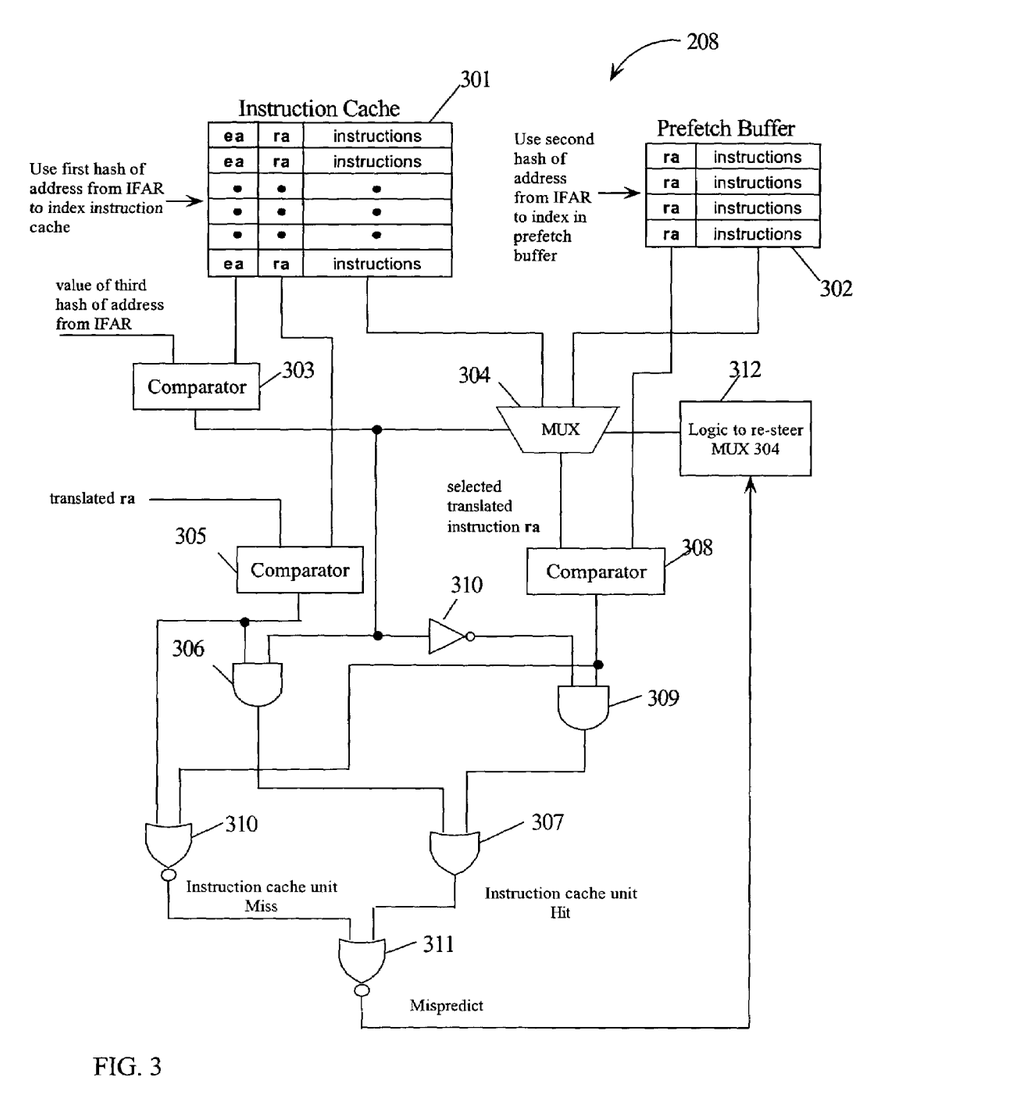
FIG. 3 illustrates an embodiment of the present invention of an instruction cache unit.
Figure 4:
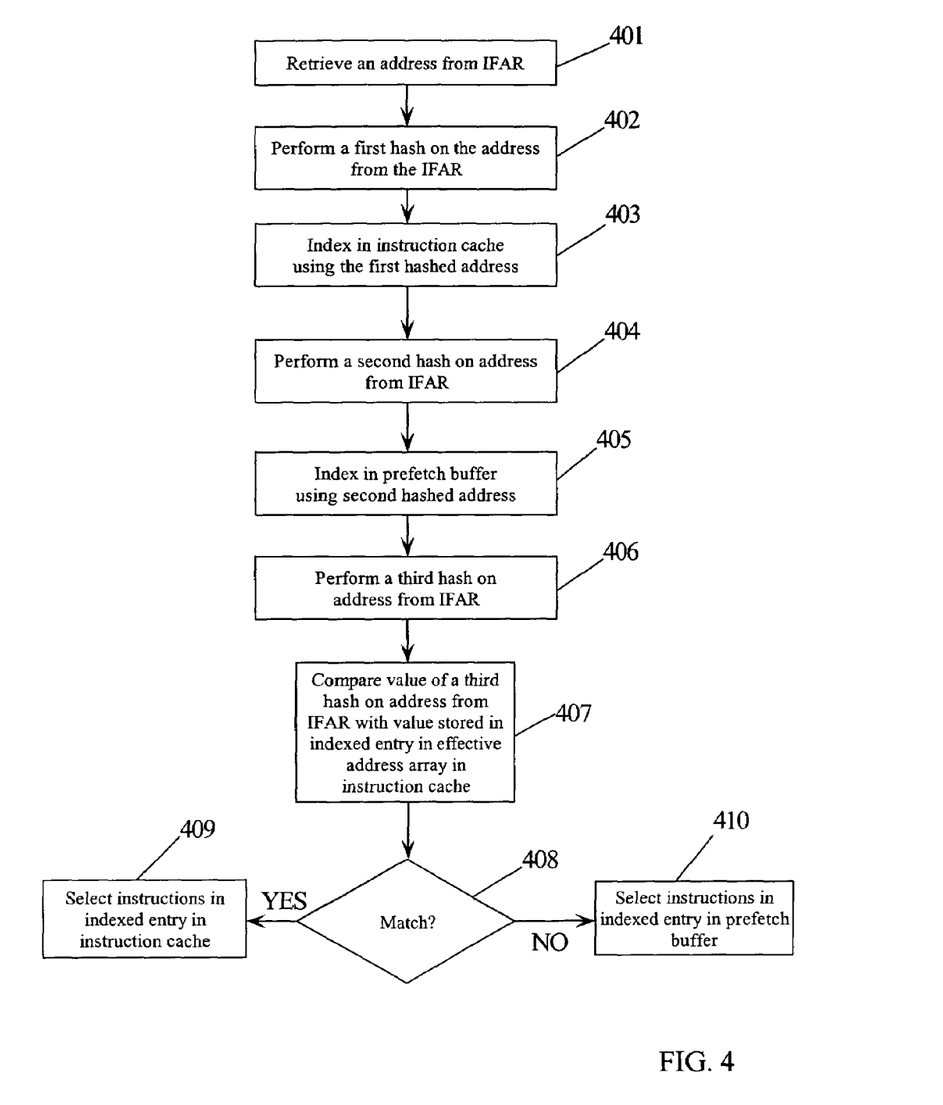
FIG. 4 is a flowchart of a method for selecting instructions in a prefetch buffer in the event of a miss in an instruction cache with a zero cycle penalty in accordance with an embodiment of the present invention.
Figure 8:
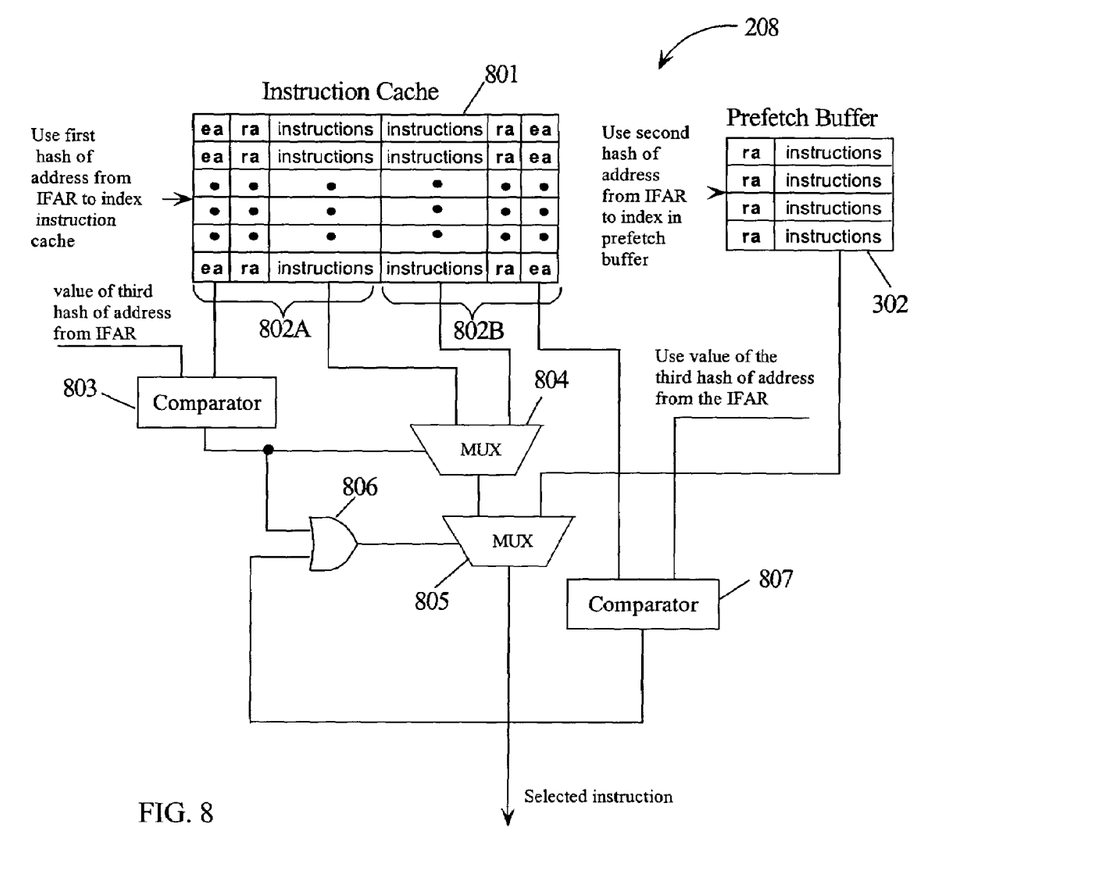
FIG. 8 illustrates another embodiment of the present invention of the instruction cache unit.
Figure 9:
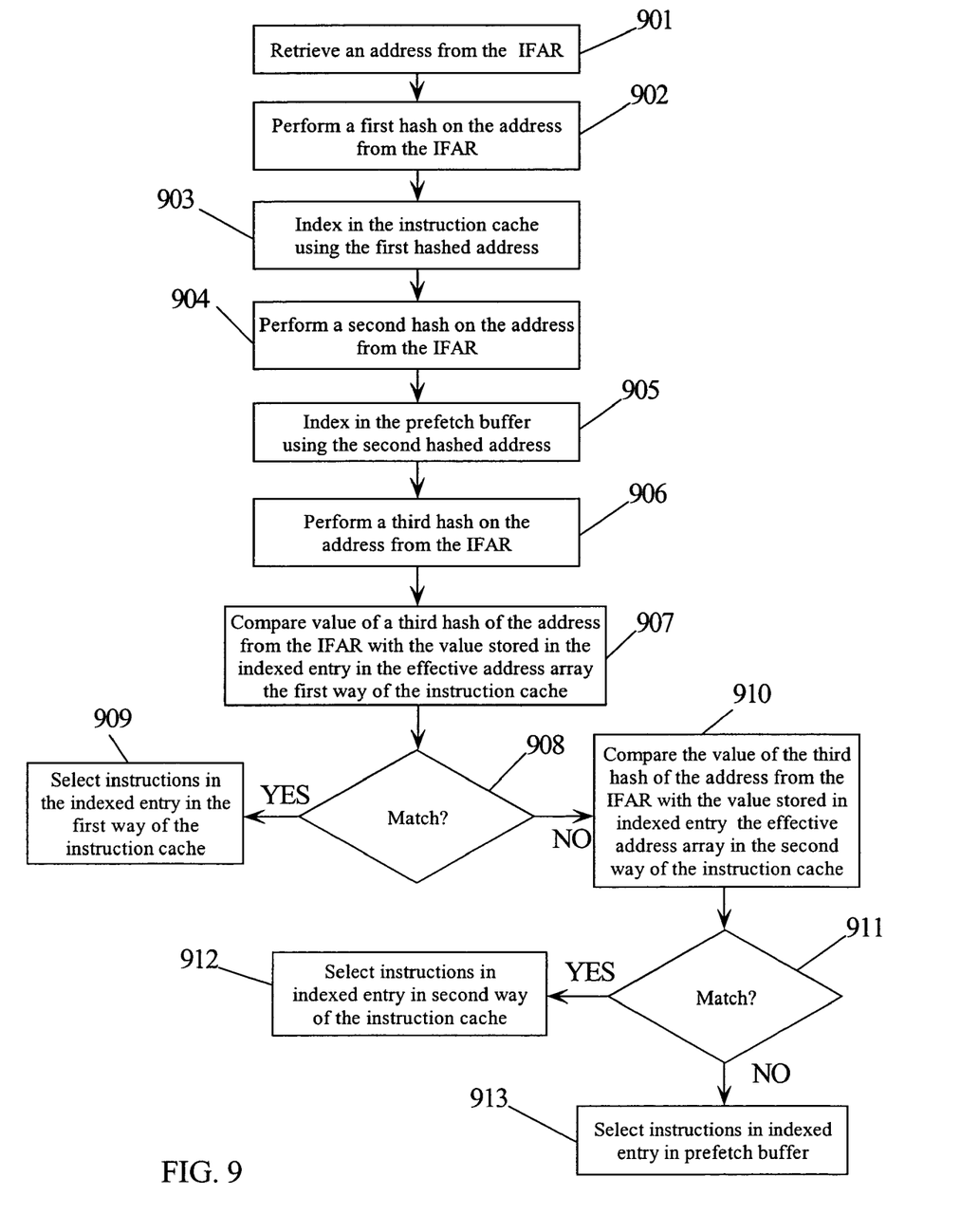
FIG. 9 is a flowchart of another method for selecting instructions in the prefetch buffer in the event of a miss in the instruction cache with a zero cycle penalty in accordance with an embodiment of the present invention.

As stated in the Background Information section, the address from the program counter may be translated into a real address using a translation table. However, the steps of translating the address from the program counter into its corresponding real address and then comparing the translated real address with the indexed real address in the instruction cache to determine if there is a cache hit or miss takes longer than a clock cycle. Hence, there is a one cycle lag in selecting the instructions in the prefetch buffer in the case of a miss in the instruction cache. By taking an extra cycle to select the instructions in the prefetch buffer in the case of a miss in the instruction cache, processor performance is hindered. Therefore, there is a need in the art to select the instructions in a prefetch buffer in the event of a miss in the instruction cache with a zero cycle penalty. FIG. 3 illustrates an embodiment of the present invention of instruction cache unit 208 configured to select the instructions in a prefetch buffer in the event of a miss in the instruction cache with a zero cycle penalty. FIG. 4 is a flowchart of a method for selecting instructions in a prefetch buffer in the event of a miss in the instruction cache with a zero cycle penalty using the embodiment disclosed in FIG. 3. FIG. 8 illustrates another embodiment of the present invention of instruction cache unit 208 configured to select the instructions in a prefetch buffer in the event of a miss in the instruction cache with a zero cycle penalty. FIG. 9 is a flowchart of a method for selecting instructions in a prefetch buffer in the event of a miss in the instruction cache with a zero cycle penalty using the embodiment disclosed in FIG. 9.

FIG. 3—Instruction Cache Unit

FIG. 3 illustrates an embodiment of the present invention of instruction cache unit 208 (FIG. 2) configured to select the instructions in a prefetch buffer in the event of a miss in the instruction cache with a zero cycle penalty.

Referring to FIG. 3, instruction cache unit 208 may comprise an instruction cache 301 and a prefetch buffer 302. Instruction cache 301 may comprise arrays of data including an array of hashed effective addresses, an array of real addresses and an array of instructions. An effective address may refer to the address retrieved from IFAR 207 (FIG. 2). The effective address may be an address of the program or compiler. The real address may refer to the address in physical memory. A hash, as used herein, may refer to either using the value stored in particular bits of the address (effective address) retrieved from IFAR 207, e.g., bits 40–49 of the address, or using an algorithm that may generate a different value and number of bits from the address (effective address) retrieved from IFAR 207. Prefetch buffer 302 may comprise an array of real addresses and an array of prefetched instructions. Prefetched instructions may refer to instructions fetched from memory, e.g., main memory 114 (FIG. 1), prior to the time the instructions are requested by processor 10 (FIG. 2). The instructions fetched from memory, e.g., main memory 114, to be stored in prefetch buffer 302 may be speculatively prefetched based on the principle that if a memory location is addressed by the processor, the next sequential address will likely be requested by the processor in the near future.

As stated above, IFU 206 may retrieve an address (effective address) from IFAR 207. IFU 206 may perform a first hash of the address retrieved from IFAR 207 using the first hash of the address to index into instruction cache 301. IFU 206 may further be configured to perform a second hash of the address retrieved from IFAR 207 using the second hash of the address to index into prefetch buffer 302.

A comparison may be made by comparator 303 comparing the value stored in the indexed entry in the effective address array of instruction cache 301 with the value of a third hash of the address retrieved from IFAR 207. The third hash of the address from IFAR 207 may be made by IFU 206. That is, a comparison may be made by comparator 303 comparing the hashed value stored in the indexed entry in the effective address array of instruction cache 301 with the value of the third hash of the address from IFAR 207. The output of comparator 303 may be coupled to a select line of multiplexer 304.

Multiplexer 304 may be configured to select either the instructions in the indexed entry in prefetch buffer 302 or the instructions in the indexed entry in instruction cache 301 based on the output of comparator 303. If the value stored in the indexed entry in the effective address array of instruction cache 301 is equal with the value of the third hash of the address from IFAR 207 (referred to as an instruction cache hit), then comparator 303 may output a signal to multiplexer 304 to cause multiplexer 304 to select the instructions in the indexed entry in instruction cache 301. If, however, the value stored in the indexed entry in the effective address array of instruction cache 301 does not equal the value of the third hash of the address from IFAR 207 (referred to as an instruction cache miss), then comparator 303 may output a signal to multiplexer 304 to cause multiplexer 304 to select the instructions in the indexed entry in prefetch buffer 302. In this manner, instruction cache unit 208 may select the instructions in prefetch buffer 302 in the event of a miss in instruction cache 301 with a zero cycle penalty. That is, instruction cache unit 208 may select the instructions in prefetch buffer 302 in the event of a miss in instruction cache 302 without an extra cycle lag.

A description of a method for selecting instructions in prefetch buffer 302 in the event of a miss in instruction cache 301 with a zero cycle penalty using this embodiment of the present invention is described further below in conjunction with FIG. 4.

As stated above, the instructions selected in either instruction cache 301 or prefetch buffer 302 are fetched using the address received from IFAR 207. If the instructions for the address received from IFAR 207 are not available in either instruction cache 301 or prefetch buffer 302, then "an instruction cache unit miss" is said to occur. Upon detection of an instruction cache unit miss, the instructions may be fetched from main memory 114. If the instructions were incorrectly selected from instruction cache 301 instead of prefetch buffer 302 or if the instructions were incorrectly selected from prefetch buffer 302 instead of instruction cache 301, then a "mispredict" is said to occur. Accordingly, the instructions may be selected from the appropriate unit (instruction cache 301 instead of prefetch buffer 302 or prefetch buffer 302 instead of instruction cache 301) as discussed below. If the instructions were correctly selected in either instruction cache 301 or prefetch buffer 302, then an "instruction cache unit hit" is said to occur. The description as to logic in instruction cache unit 208 determining if either an instruction cache unit hit, an instruction cache unit miss or a mispredict occurred is provided below.

Referring to FIG. 3, in one embodiment of the present invention, an instruction cache unit hit may be determined by translating the received effective address into the corresponding real address using a translation table (not shown) stored in IFU 206. The translated real address may be compared with the real address in the indexed entry in instruction cache 301 by comparator 305. If the translated real address matches the real address in the indexed entry in instruction cache 301, then comparator 305 outputs a logical value of "1." Otherwise, comparator 305 outputs a value of "0."

The output of comparator 305 may be inputted to AND gate 306. AND gate 306 may also receive as input the output of comparator 303. As stated above, the output of comparator 303 may be a logical value of "1," when there is an instruction cache hit. Conversely, the output of comparator 303 may be the value of "0", when there is an instruction cache miss. The output of AND gate 306 may be inputted to OR gate 307. The output of OR gate 307 may indicate if there is an instruction cache unit hit. Hence, when the translated real address matches the real address in the indexed entry in instruction cache 301 and there is an instruction cache hit, then there is an instruction cache unit hit. When the translated real address matches the real address in the indexed entry in instruction cache 301 and there is an instruction cache hit, the output of AND gate 306 is a logical value of "1" which causes OR gate 307 to output a logical value of "1" indicating an instruction cache unit hit.

However, the predicted instructions may have been selected in prefetch buffer 302. In order to determine if this was correct, the translated real address, as discussed above, may be compared with the real address in the indexed entry in prefetch buffer 302 by comparator 308. If the translated real address matches the real address in the indexed entry in prefetch buffer 302, then comparator 308 outputs a logical value of "1." Otherwise, comparator 308 outputs a value of "0."

The output of comparator 308 may be inputted to AND gate 309. AND gate 309 may also receive as input the inverted output of comparator 303. The output of comparator 303 may be inverted via inverter 310. As stated above, the output of comparator 303 may be a logical value of "1," when there is an instruction cache hit. Conversely, the output of comparator 303 may be the value of "0", when there is an instruction cache miss. The output of AND gate 309 may be inputted to OR gate 307. The output of OR gate 307 may indicate if there is an instruction cache unit hit. Hence, when the translated real address matches the real address in the indexed entry in prefetch buffer 302 and there is an instruction cache miss, then there is an instruction cache unit hit. When the translated real address matches the real address in the indexed entry in prefetch buffer 302 and there is an instruction cache miss, then the output of AND gate 309 is a logical value of "1" which causes OR gate 307 to output a logical value of "1" indicating an instruction cache unit hit.

In one embodiment, an instruction cache unit miss may be determined by performing the NOR function on the output of comparators 305, 308 by NOR gate 310. An instruction cache unit miss may occur when the translated real address does not match the real address in either the indexed entry in instruction cache 301 or in the indexed entry in prefetch buffer 302. This may be indicated when the output of both comparators 305, 308 is zero thereby causing NOR gate 310 to output a logic value of "1" to signify an instruction cache unit miss. Upon detection of an instruction cache unit miss, the appropriate instructions may be fetched from main memory 114.

In one embodiment, a mispredict may be detected by performing the NOR function on the output of NOR gate 310 and OR gate 307 by NOR gate 311. If neither an instruction cache unit hit or miss is indicated, then a mispredict occurred. This may be indicated when the output of both NOR gate 310 and OR gate 307 is zero thereby causing NOR gate 311 to output a logic value of "1" to signify a mispredict. Upon detection of a mispredict, logic unit 312 may be configured to force MUX 304 to select the instructions in the indexed entry in the other unit (instruction cache 301 if improperly selected the instructions in prefetch buffer 302 or vice-versa). This may be referred to as "resteering." Logic unit 312 may be configured to resteer MUX 304 to select the instructions in the indexed entry in the other unit upon receiving an indication of a mispredict from NOR gate 311. Resteering MUX 304 may be performed on a subsequent clock cycle along with a request of the same received address from IFAR 207. Circuitry configured to resteer a multiplexer is known in the art and need not be discussed in detail. It is noted that such circuitry would be recognized by an artisan of ordinary skill in the art and that embodiments employing such circuitry would fall within the scope of the present invention. It is further noted that mispredicts may be uncommon with appropriately valued hashes stored in the array of hashed effective addresses in instruction cache 301.

In another embodiment, a mispredict may be treated as an instruction cache unit miss. Consequently, upon detecting a mispredict, the appropriate instructions may be fetched from main memory 114.

A description of a method for determining if an instruction cache unit hit occurred is provided further below in conjunction with FIG. 5. A description of a method for determining if an instruction cache unit miss occurred is provided further below in conjunction with FIG. 6. A description of a method for determining if a mispredict occurred is provided further below in conjunction with FIG. 7.

FIG. 4—Method for Selecting Instructions in a Prefetch Buffer in the Event of a Miss in an Instruction Cache with a Zero Cycle Penalty FIG. 4 is a flowchart of one embodiment of the present invention of a method 400 for selecting instructions in prefetch buffer 302 (FIG. 3) in the event of a miss in instruction cache 301 (FIG. 3) with a zero cycle penalty.

Referring to FIG. 4, in conjunction with FIGS. 2–3, in step 401, IFU 206 fetches an address from IFAR 207. As stated above, the address retrieved from IFAR 207 may refer to an effective address. In step 402, IFU 206 performs a first hash on the address retrieved from IFAR 207. As stated above, a hash as used herein, may refer to either using the value stored in particular bits of the address (effective address) retrieved from IFAR 207, e.g., bits 40–49 of the address, or using an algorithm that may generate a different value and number of bits from the address (effective address) retrieved from IFAR 207. In step 403, IFU 206 indexes in instruction cache 301 using the first hash of the address from IFAR 207.

In step 404, IFU 206 performs a second hash on the address retrieved from IFAR 207. In step 405, IFU 206 indexes in prefetch buffer 302 using the second hash of the address from IFAR 207.

In step 406, IFU 206 performs a third hash on the address retrieved from IFAR 207.

In step 407, a comparison is made by comparator 303 between the value of the third hash of the address from IFAR 207 with the value stored in the indexed entry in the effective address array in instruction cache 301. As stated above, the value stored in the effective address array in instruction cache 301 may be hashed values of the effective addresses.

A determination is made by comparator 303 in step 408 as to whether there is a match between the value of the third hash of the address from IFAR 207 with the value stored in the indexed entry in the effective address of instruction cache 301.

If the value stored in the indexed entry in the effective address array of instruction cache 301 is equal with the value of the third hash of the address from IFAR 207 (referred to as a cache hit), then multiplexer 304, in step 409, selects the instructions in the indexed entry in the effective address array of instruction cache 301. If, however, the value stored in the indexed entry in the effective address array of instruction cache 301 does not equal the value of the third hash of the address from IFAR 207 (referred to as cache miss), then multiplexer 304, in step 410, selects the instructions in the indexed entry in prefetch buffer 302. In this manner, instruction cache unit 208 may select the instructions in prefetch buffer 302 in the event of a miss in instruction cache 301 with a zero cycle penalty.

It is noted that method 400 may include other and/or additional steps that, for clarity, are not depicted. It is further noted that method 400 may be executed in a different order presented and that the order presented in the discussion of FIG. 4 is illustrative. For example, steps 403–404 may be executed following comparison step 407. It is further noted that certain steps in method 400 may be executed in a substantially simultaneous manner.

Figure 5:
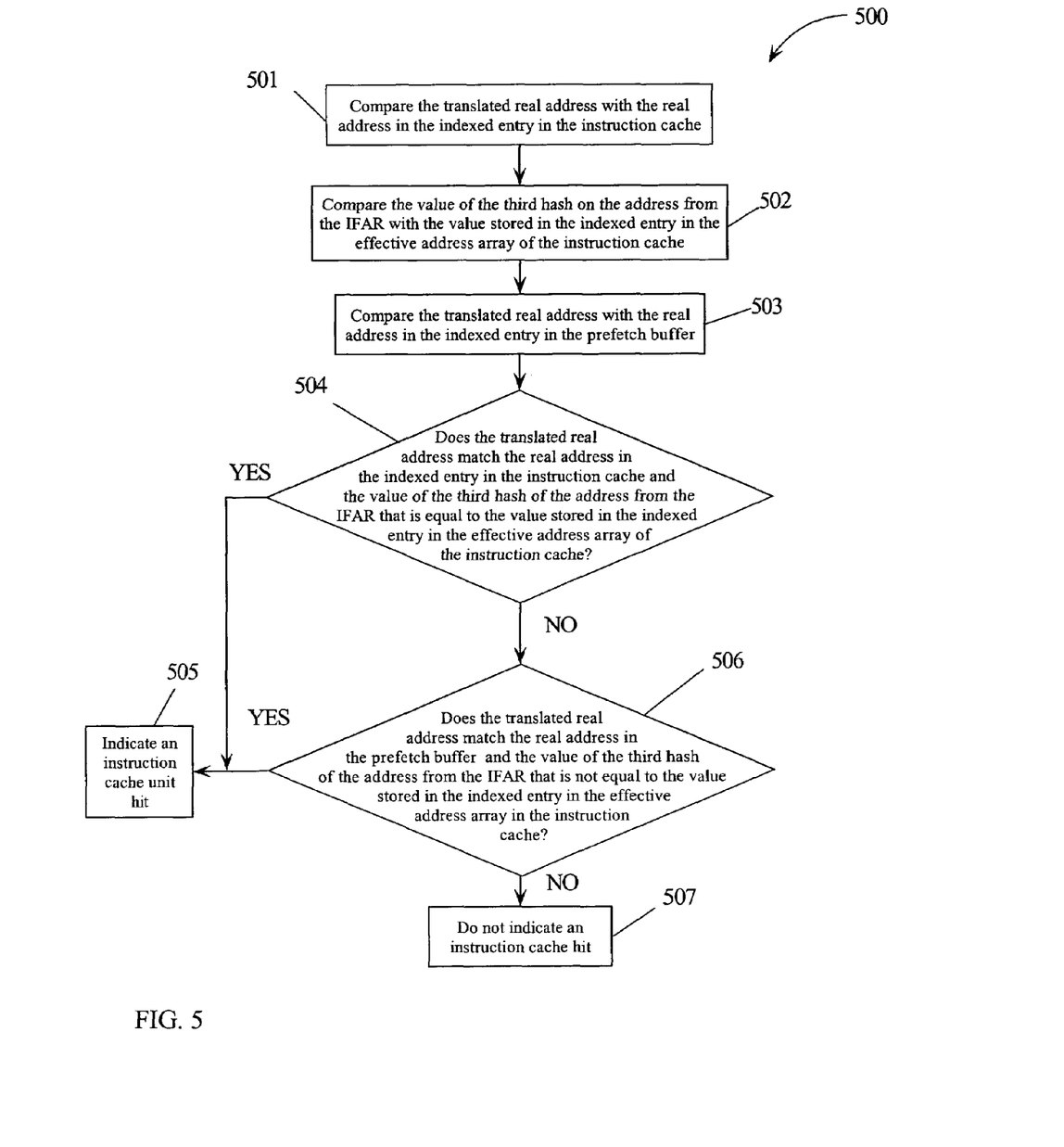
FIG. 5 is a flowchart of a method for determining if an instruction cache unit hit occurred in accordance with an embodiment of the present invention.

FIG. 5—Method for Determining if an Instruction Cache Unit Hit Occurred

FIG. 5 is a flowchart of one embodiment of the present invention of a method 500 for determining if an instruction cache unit hit occurred.

Referring to FIG. 5, in conjunction with FIGS. 2–3, in step 501, comparator 305 compares the translated real address with the real address in the indexed entry in instruction cache 301. In step 502, comparator 303 compares the value of the third hash of the address from IFAR 207 with the value stored in the effective address array in the indexed entry in instruction cache 301. In step 503, comparator 308 compares the translated real address with the real address in the indexed entry in prefetch buffer 302.

In step 504, a determination is made by instruction cache unit 208 as to whether the translated real address matches the real address in the indexed entry in instruction cache 301 and the value of the third hash of the address from IFAR 207 is equal with the value stored in the effective address array in the indexed entry in instruction cache 301. The determination may be accomplished by ANDing the output of comparators 305, 303 by AND gate 306.

If the translated real address matches the real address in the indexed entry in instruction cache 301 and the value of the third hash of the address from IFAR 207 is equal with the value stored in the effective address array in the indexed entry in instruction cache 301, then an instruction cache unit hit is indicated in step 505. As stated above, if the translated real address matches the real address in the indexed entry in instruction cache 301 and if the value of the third hash of the address from IFAR 207 is equal with the value stored in the effective address array in the indexed entry in instruction cache 301, then the output of AND gate 306 is equal to the logical value of "1" thereby causing OR gate 307 to output a logical value of "1" indicating an instruction cache unit hit.

If either the translated real address does not match the real address in the indexed entry in instruction cache 301 or the value of the third hash of the address from IFAR 207 does not equal the value stored in the indexed entry in the effective address array of instruction cache 301, then a determination is made, in step 506, by instruction cache unit 208 as to whether the translated real address matches the real address in the indexed entry in prefetch buffer 302 and the value of the third hash of the address from IFAR 207 does not equal the value stored in the indexed entry in the effective address array of instruction cache 301. The determination may be accomplished by ANDing the output of comparator 308 and the inversion of the output of comparator 303 by AND gate 309.

If the translated real address matches the real address in the indexed entry in prefetch buffer 302 and the value of the third hash of the address from IFAR 207 is not equal with the value stored in the indexed entry in the effective address array of instruction cache 301, then an instruction cache unit hit is indicated in step 505. As stated above, if the translated real address matches the real address in the indexed entry in prefetch buffer and the value of the third hash of the address from IFAR 207 is not equal with the value stored in the indexed entry in the effective address array of instruction cache 301, then the output of AND gate 309 is equal to the logical value of "1" thereby causing OR gate 307 to output a logical value of "1" indicating an instruction cache unit hit.

If either the translated real address does not match the real address in the indexed entry in prefetch buffer 302 or the value of the third hash of the address from IFAR 207 equals the value stored in the indexed entry in the effective address array of instruction cache 301, then an instruction cache unit hit is not indicated in step 507.

It is noted that method 500 may include other and/or additional steps that, for clarity, are not depicted. It is further noted that method 500 may be executed in a different order presented and that the order presented in the discussion of FIG. 5 is illustrative. It is further noted that certain steps in method 500 may be executed in a substantially simultaneous manner.

Figure 6:
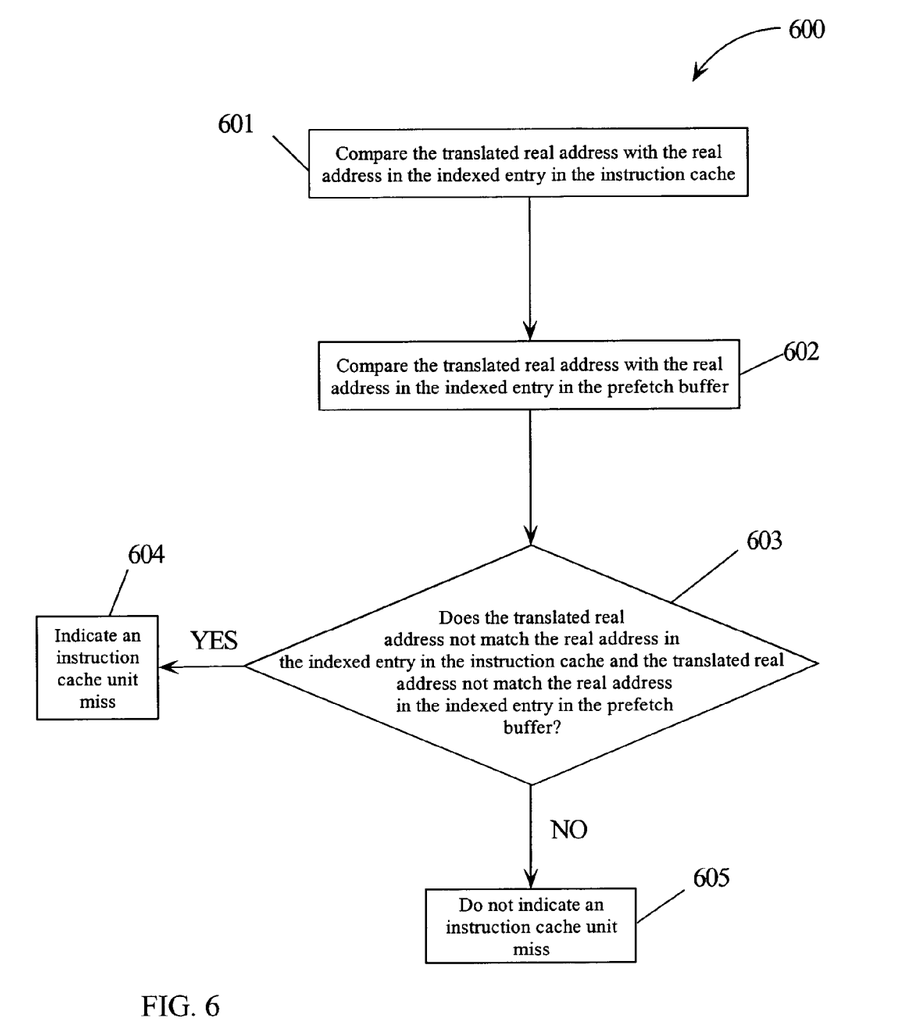
FIG. 6 is a flowchart of a method for determining if an instruction cache unit miss occurred in accordance with an embodiment of the present invention.

FIG. 6—Method for Determining if an Instruction Cache Unit Miss Occurred

FIG. 6 is a flowchart of one embodiment of the present invention of a method 600 for determining if an instruction cache unit miss occurred.

Referring to FIG. 6, in conjunction with FIGS. 2–3, in step 601, comparator 305 compares the translated real address with the real address in the indexed entry in instruction cache 301. In step 602, comparator 308 compares the translated real address with the real address in the indexed entry in prefetch buffer 302.

In step 603, a determination is made by instruction cache unit 208 as to whether the translated real address does not match the real address in the indexed entry in instruction cache 301 and the translated real address does not match the real address in the indexed entry in prefetch buffer 302. The determination may be accomplished by NORing the output of comparators 305, 308 by NOR gate 310.

If the translated real address does not match the real address in the indexed entry in instruction cache 301 and the translated real address does not match the real address in the indexed entry in prefetch buffer 302, then an instruction cache unit miss is indicated in step 604. As stated above, if the translated real address does not match the real address in the indexed entry in instruction cache 301, then comparator 305 outputs a value of "0" to NOR gate 310. Further, if the translated real address does not match the real address in the indexed entry in prefetch buffer 302, then comparator 308 outputs a value of "0" to NOR gate 310. When both comparators 305, 308 output a value of "0", NOR gate 310 outputs a logical value of "1" indicating an instruction cache unit miss.

If either the translated real address matches the real address in the indexed entry in instruction cache 301 or the translated real address matches the real address in the indexed entry in prefetch buffer 302, then an instruction cache unit miss is not indicated in step 605.

It is noted that method 600 may include other and/or additional steps that, for clarity, are not depicted. It is further noted that method 600 may be executed in a different order presented and that the order presented in the discussion of FIG. 6 is illustrative. It is further noted that certain steps in method 600 may be executed in a substantially simultaneous manner.

Figure 7:
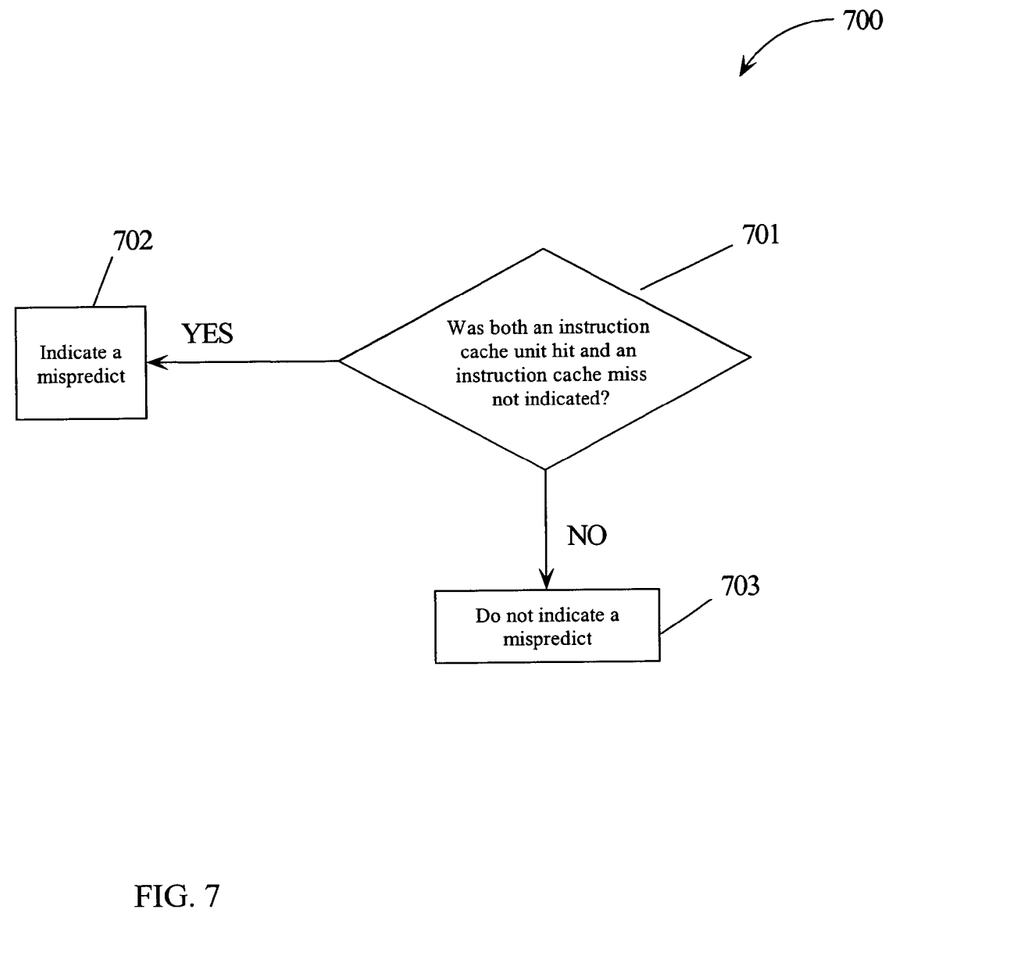
FIG. 7 is a flowchart of a method for determining if a mispredict occurred in accordance with an embodiment of the present invention.

FIG. 7—Method for Determining if a Mispredict Occurred

FIG. 7 is a flowchart of one embodiment of the present invention of a method 700 for determining if a mispredict occurred.

Referring to FIG. 7, in conjunction with FIGS. 2–3, in step 701, a determination is made by instruction cache unit 208 as to whether both an instruction cache unit hit and an instruction cache unit miss was not indicated. As stated above, in step 605 of method 600 (FIG. 6), an instruction cache unit miss is not indicated if either the translated real address matches the real address in the indexed entry in instruction cache 301 or the translated real address matches the real address in the indexed entry in prefetch buffer 302. Further, as stated above, in step 507 of method 500 (FIG. 5), an instruction cache unit hit is not indicated if either the translated real address does not match the real address in the indexed entry in prefetch buffer 302 or the value of the third hash of the address from IFAR 207 equals the value stored in the effective address array in the indexed entry in instruction cache 301.

If both an instruction cache unit hit and an instruction cache unit miss were not indicated, then a mispredict is indicated in step 702. Otherwise, a mispredict is not indicated in step 703.

It is noted that method 700 may include other and/or additional steps that, for clarity, are not depicted. It is further noted that method 700 may be executed in a different order presented and that the order presented in the discussion of FIG. 7 is illustrative. It is further noted that certain steps in method 700 may be executed in a substantially simultaneous manner.

FIG. 8—Another Embodiment of Instruction Cache Unit

FIG. 8 illustrates another embodiment of the present invention of instruction cache unit 208 (FIG. 2) configured to select the instructions in a prefetch buffer in the event of a miss in the instruction cache with a zero cycle penalty.

Referring to FIG. 8, instruction cache unit 208 may comprise an instruction cache 801 and prefetch buffer 302 (FIG. 3). Instruction cache 801 may be configured similarly as instruction cache 301 (FIG. 3) except that instruction cache 801 may comprise additional arrays of data including an additional array of hashed effective addresses, an additional array of real addresses and an additional array of instructions. In one embodiment, instruction cache 801 may be configured as a 2-way set associative cache as illustrated in FIG. 8. The first way may refer to the arrays of hashed effective addresses, real addresses and instructions as indicated by 802A. The second way may refer to the arrays of hashed effective addresses, real addresses and instructions as indicated by 802B. As stated above, an effective address may refer to the address retrieved from IFAR 207 (FIG. 2). The effective address may be an address of the program or compiler. Further, the values stored in the effective address arrays in first way 802A, second way 802B of instruction cache 801 may be hashed values of the effective addresses. The real address may refer to the address in physical memory. A hash, as used herein, may refer to either using the value stored in particular bits of the address (effective address) retrieved from IFAR 207, e.g., bits 40–49 of the address, or using an algorithm that may generate a different value and number of bits from the address (effective address) retrieved from IFAR 207.

As stated above, IFU 206 may retrieve an address (effective address) from IFAR 207. IFU 206 may perform a first hash of the address retrieved from IFAR 207 using the first hash of the address to index into instruction cache 801. IFU 206 may further be configured to perform a second hash of the address retrieved from IFAR 207 using the second hash of the address to index into prefetch buffer 302.

A comparison may be made by comparator 803 comparing the value stored in the indexed entry in the effective address array in first way 802A of instruction cache 801 with the value of a third hash of the address from IFAR 207. The third hash of the address retrieved from IFAR 207 may be performed by IFU 206. That is, a comparison may be made by comparator 803 comparing the hashed value stored in the indexed entry in the effective address array in first way 802A of instruction cache 801 with the value of the third hash of the address retrieved from IFAR 207. The output of comparator 803 may be coupled to a select line of multiplexer 804.

Multiplexer 804 may be configured to select either the instructions in the indexed entry in first way 802A or second way 802B of instruction cache 801 based on the output of comparator 803. If the value stored in the indexed entry in the effective address array in first way 802A of instruction cache 801 is equal with the value of the third hash of the address retrieved from IFAR 207 (referred to as an instruction cache hit), then comparator 803 may output a logical value of "1" to multiplexer 804 to cause multiplexer 804 to select the instructions in the indexed entry in first way 802A in instruction cache 801. The output of multiplexer 804 may be inputted to multiplexer 805. Multiplexer 805 may further receive as input the instructions from the indexed entry in prefetch buffer 302. When the input to multiplexer 805 is the instructions in the indexed entry in first way 802A of instruction cache 801, multiplexer 805 selects the instructions in the indexed entry in first way 802A of instruction cache 801 since the output of comparator 803 (a logical value of "1") is inputted to OR gate 806 coupled to a select line of multiplexer 805. Since the output of OR gate 806 is a logical value of "1", the input from multiplexer 804 is selected.

If, however, the value stored in the indexed entry in the effective address array in first way 802A of instruction cache 801 does not equal the value of the third hash of the address retrieved from IFAR 207, then comparator 803 may output a value of "0" to multiplexer 804 to cause multiplexer 804 to select the instructions in the indexed entry in second way 802B in instruction cache 801. As stated above, the output of multiplexer 804 is inputted to multiplexer 805. Further, the output (a value of "0") of comparator 803 is inputted to OR gate 806 coupled to the select line of multiplexer 805.

A comparison may further be made by comparator 807 comparing the value stored in the indexed entry in the effective address array in second way 802B of instruction cache 801 with the value of the third hash of the address retrieved from IFAR 207. That is, a comparison may be made by comparator 807 comparing the hashed value stored in the indexed entry in the effective address array in second way 802B of instruction cache 801 with the value of the third hash of the address retrieved from IFAR 207. The output of comparator 807 may be inputted to OR gate 806.

As stated above, if the value stored in the indexed entry in the effective address array in first way 802A of instruction cache 801 does not equal the value of the third hash of the address retrieved from IFAR 207, then comparator 803 may output a value of "0" to OR gate 806. Further, if the value stored in the indexed entry in the effective address array in second way 802B of instruction cache 801 is equal with the value of the third hash of the address retrieved from IFAR 207 (referred to as an instruction cache hit), then comparator 807 may output a logical value of "1" to OR gate 806 thereby causing OR gate 806 to output a logical value of "1" to multiplexer 805 thereby causing multiplexer 805 to select the instructions inputted from multiplexer 804 (the instruction in the indexed entry in second way 802B of instruction cache 801). If, however, the value stored in the indexed entry in the effective address array in second way 802B of instruction cache 801 does not equal the value of the third hash of the address retrieved from IFAR 207 (referred to as an instruction cache miss), then comparator 807 may output a value of "0" to OR gate 806 thereby causing OR gate 806 to output a value of "0" to multiplexer 805 thereby causing multiplexer 805 to select the input from prefetch buffer 302 (instructions in the indexed entry in prefetch buffer 302).

In this manner, instruction cache unit 208 may select the instructions in prefetch buffer 302 in the event of a miss in instruction cache 801 with a zero cycle penalty. That is, instruction cache unit 208 may select the instructions in prefetch buffer 302 in the event of a miss in instruction cache 801 without an extra cycle lag.

A description of a method for selecting instructions in prefetch buffer 302 in the event of a miss in instruction cache 801 with a zero cycle penalty using this embodiment of the present invention is described below.

A determination as to whether an instruction cache unit hit, an instruction cache unit miss or a mispredict occurred in the embodiment of instruction cache unit 208 discussed above may similarly be determined as discussed in FIGS. 4–7. A description of incorporating logic in the embodiment of instruction cache unit 208 discussed above to perform the function of determining whether an instruction cache unit hit, an instruction cache unit miss or a mispredict occurred is avoided for sake of brevity. It is noted that a person or ordinary skill in the art would be capable of adapting the logic discussed in FIG. 3 that performs the function of determining whether an instruction cache unit hit, an instruction cache unit miss or a mispredict occurred to perform the same function in the embodiment of instruction cache unit 208 discussed above. It is further noted that such embodiments incorporating such logic would fall within the scope of the present invention.

FIG. 9—Another Method for Selecting Instructions in a Prefetch Buffer in the Event of a Miss in an Instruction Cache with a Zero Cycle Penalty FIG. 9 is a flowchart of one embodiment of the present invention of a method 900 for selecting instructions in prefetch buffer 302 (FIG. 8) in the event of a miss in instruction cache 801 (FIG. 8) with a zero cycle penalty.

Referring to FIG. 9, in conjunction with FIGS. 2 and 8, in step 901, IFU 206 fetches an address retrieved from IFAR 207. As stated above, the address retrieved from IFAR 207 may refer to an effective address. In step 902, IFU 206 performs a first hash on the address retrieved from IFAR 207. In step 903, IFU 206 indexes in instruction cache 801 using the first hash of the address retrieved from IFAR 207.

In step 904, IFU 206 performs a second hash on the address retrieved from IFAR 207. In step 905, IFU 206 indexes in prefetch buffer 302 using the second hash of the address retrieved from IFAR 207.

In step 906, IFU 206 performs a third hash on the address retrieved from IFAR 207.

In step 907, a comparison is made by comparator 803 between the value of the third hash of the address retrieved from IFAR 207 with the value stored in the indexed entry in the effective address array in first way 802A of instruction cache 801. As stated above, the value stored in the effective address array in first way 802A of instruction cache 801 may be hashed values of the effective addresses.

A determination is made in step 908 by comparator 803 as to whether there is a match between the value of the third hash of the address retrieved from IFAR 207 with the value stored in the indexed entry in the effective address in first way 802A of instruction cache 801.

If the value stored in the indexed entry in the effective address array in first way 802A of instruction cache 801 is equal with the value of the third hash of the address retrieved from IFAR 207 (referred to as an instruction cache hit), then, in step 909, multiplexer 805 selects the instructions in the indexed entry in the effective address array in first way 802A of instruction cache 801.

If, however, the value stored in the indexed entry in the effective address array in first way 802A of instruction cache 801 does not equal the value of the third hash of the address retrieved from IFAR 207, then, in step 910, a comparison is made by comparator 807 between the value of the third hash of the address retrieved from IFAR 207 with the value stored in the indexed entry in the effective address array in second way 802B of instruction cache 801.

A determination is made in step 911 by comparator 807 as to whether there is a match between the value of the third hash of the address retrieved from IFAR 207 with the value stored in the indexed entry in the effective address in second way 802B of instruction cache 801.

If the value stored in the indexed entry in the effective address array in second way 802B of instruction cache 801 is equal with the value of the third hash of the address retrieved from IFAR 207 (referred to as an instruction cache hit), then, in step 912, multiplexer 805 selects the instructions in the indexed entry in the effective address array in second way 802A of instruction cache 801. If, however, the value stored in the indexed entry in the effective address array in second way 802B of instruction cache 801 is not equal with the value of the third hash of the address retrieved from IFAR 207 (referred to as an instruction cache miss), then, in step 913, multiplexer 805 selects the instructions in the indexed entry in prefetch buffer 302. In this manner, instruction cache unit 208 may select the instructions in prefetch buffer 302 in the event of a miss in instruction cache 801 with a zero cycle penalty.

It is noted that method 900 may include other and/or additional steps that, for clarity, are not depicted. It is further noted that method 900 may be executed in a different order presented and that the order presented in the discussion of FIG. 9 is illustrative. For example, steps 903–904 may be executed following comparison step 907. It is further noted that certain steps in method 900 may be executed in a substantially simultaneous manner.

Although the method and processor are described in connection with several embodiments, it is not intended to be limited to the specific forms set forth herein, but on the contrary, it is intended to cover such alternatives, modifications and equivalents, as can be reasonably included within the spirit and scope of the invention as defined by the appended claims. It is noted that the headings are used only for organizational purposes and not meant to limit the scope of the description or claims.

The invention claimed is:

1. A method for selecting instructions in a prefetch buffer comprising the steps of:
   retrieving an address;
   performing a first hash on said address;
   indexing in an instruction cache using said first hash on said address;
   performing a second hash on said address;
   indexing in said prefetch buffer using said second hash on said address;
   performing a third hash on said address;
   comparing a value of said third hash on said address with a value stored in the indexed entry in an effective address array of said instruction cache; and
   selecting instructions in said indexed entry of said prefetch buffer if said value stored in said indexed entry in said effective address array of said instruction cache does not match said value of said third hash on said address.

2. The method as recited in claim 1 further comprising the step of:
   selecting instructions in said indexed entry of said instruction cache if said value stored in said indexed entry in said effective address array of said instruction cache matches said value of said second hash on said address.

3. The method as recited in claim 2 further comprising the steps of:
   comparing a translated real address of said address with a real address in said indexed entry in said instruction cache; and
   comparing said translated real address of said address with a real address in said indexed entry in said prefetch buffer.

4. The method as recited in claim 3 further comprising the step of:
   indicating an instruction cache unit hit if said translated real address of said address matches said real address in said indexed entry in said instruction cache and said value of said third hash of said address equals said value stored in said indexed entry in said effective address array of said instruction cache.

5. The method as recited in claim 3 further comprising the step of:
   indicating an instruction cache unit hit if said translated real address of said address matches said real address in said indexed entry in said prefetch buffer and said value of said third hash of said address does not equal said value stored in said indexed entry in said effective address array of said instruction cache.

6. The method as recited in claim 3 further comprising the step of:
   indicating an instruction cache unit miss if said translated real address of said address does not match said real address in said indexed entry in said instruction cache and said translated real address of said address does not match said real address in said indexed entry in said prefetch buffer.

7. The method as recited in claim 3 further comprising the step of:
   indicating a mispredict if an instruction cache unit hit is not indicated and an instruction unit miss is not indicated.

8. A processor, comprising:
   a program counter;
   an instruction fetch unit coupled to said program counter, wherein said instruction fetch unit is configured to retrieve an address from said program counter, wherein said instruction fetch unit comprises:
   an instruction cache unit, wherein said instruction cache unit comprises an instruction cache and a prefetch buffer configured to store instructions;
   logic for performing a first hash on said address;
   logic for indexing in said instruction cache using said first hash on said address;
   logic for performing a second hash on said address;
   logic for indexing in said prefetch buffer using said second hash on said address; and
   logic for performing a third hash on said address;
   wherein said instruction cache unit further comprises:
   logic for comparing a value of said third hash on said address with a value stored in the indexed entry in an effective address array of said instruction cache; and
   logic for selecting instructions in said indexed entry of said prefetch buffer if said value stored in said indexed entry in said effective address array of said instruction cache does not match said value of said third hash on said address.

9. The processor as recited in claim 8, wherein said instruction fetch unit further comprises:
   logic for selecting instructions in said indexed entry of said instruction cache if said value stored in said indexed entry in said effective address array of said instruction cache matches said value of said third hash on said address.

10. The processor as recited in claim 9, wherein said instruction cache unit further comprises:
    logic for comparing a translated real address of said address with a real address in said indexed entry in said instruction cache; and
    logic for comparing said translated real address of said address with a real address in said indexed entry in said prefetch buffer.

11. The processor as recited in claim 10, wherein said instruction cache unit further comprises:
    logic for indicating an instruction cache unit hit if said translated real address of said address matches said real address in said indexed entry in said instruction cache and said value of said third hash of said address equals said value stored in said indexed entry in said effective address array of said instruction cache.

12. The processor as recited in claim 10, wherein said instruction cache unit further comprises:
    logic for indicating an instruction cache unit hit if said translated real address of said address matches said real address in said indexed entry in said prefetch buffer and said value of said third hash of said address does not equal said value stored in said indexed entry in said effective address array of said instruction cache.

13. The processor as recited in claim 10, wherein said instruction cache unit further comprises:

logic for indicating an instruction cache unit miss if said translated real address of said address does not match said real address in said indexed entry in said instruction cache and said translated real address of said address does not match said real address in said indexed entry in said prefetch buffer.

14. The processor as recited in claim 10, wherein said instruction cache unit further comprises:
  logic for indicating a mispredict if an instruction cache unit hit is not indicated and an instruction unit miss is not indicated.

15. A method for selecting instructions in a prefetch buffer comprising the steps of:
  retrieving an address;
  performing a first hash on said address;
  indexing in an instruction cache using said first hash on said address;
  performing a second hash on said address;
  indexing in said prefetch buffer using said second hash on said address;
  performing a third hash on said address;
  comparing a value of said third hash on said address with a value stored in the indexed entry in an effective address array in a first way of said instruction cache; and
  selecting instructions in the indexed entry in said prefetch buffer if said value of said third hash on said address does not match said value stored in said indexed entry in said effective address array in said first way of said instruction cache.

16. The method as recited in claim 15 further comprising the step of:
  comparing said value of said third hash on said address with a value stored in said indexed entry in said effective address array in a second way of said instruction cache.

17. The method as recited in claim 16, wherein if said value of said third hash on said address matches said value stored in said indexed entry in said effective address array in said second way of said instruction cache then the method further comprises the step of:
  selecting instructions in said indexed entry in said second way of said instruction cache.

18. The method as recited in claim 16, wherein said value of said third hash on said address is compared with said value stored in said indexed entry in said effective address array in said first way of said instruction cache if said value of said third hash on said address does not match said value stored in said indexed entry in said effective address array in said second way of said instruction cache.

19. The method as recited in claim 15, wherein if said value of said third hash on said address matches said value stored in said indexed entry in said effective address array in said first way of said instruction cache then the method further comprises the step of:
  selecting instructions in said indexed entry in said first way of said instruction cache.

20. A processor, comprising:
  a program counter;
  an instruction fetch unit coupled to said program counter, wherein said instruction fetch unit is configured to retrieve an address from said program counter, wherein said instruction fetch unit comprises:
  an instruction cache unit, wherein said instruction cache unit comprises an instruction cache and a prefetch buffer configured to store instructions;
  logic for performing a first hash on said address;
  logic for indexing in said instruction cache using said first hash on said address;
  logic for performing a second hash on said address;
  logic for indexing in said prefetch buffer using said second hash on said address; and
  logic for performing a third hash on said address;
  wherein said instruction cache unit further comprises:
  logic for comparing a value of said third hash on said address with a value stored in the indexed entry in an effective address array in a first way of said instruction cache; and
  logic for selecting instructions in the indexed entry in said prefetch buffer if said value of said third hash on said address does not match said value stored in said indexed entry in said effective address array in said first way of said instruction cache.

21. The processor as recited in claim 20, wherein said instruction cache unit further comprises:
  logic for comparing said value of said third hash on said address with a value stored in said indexed entry in said effective address array in a second way of said instruction cache.

22. The processor as recited in claim 21, wherein said instruction cache unit further comprises:
  logic for selecting instructions in said indexed entry in said second way of said instruction cache if said value of said third hash on said address matches said value stored in said indexed entry in said effective address array in said second way of said instruction cache.

23. The processor as recited in claim 21, wherein said value of said third hash on said address is compared with said value stored in said indexed entry in said effective address array in said first way of said instruction cache if said value of said third hash on said address does not match said value stored in said indexed entry in said effective address array in said second way of said instruction cache.

24. The processor as recited in claim 20, wherein said instruction cache unit further comprises:
  logic for selecting instructions in said indexed entry in said first way of said instruction cache if said value of said third hash on said address matches said value stored in said indexed entry in said effective address array in said first way of said instruction cache.

* * * * *